Nov. 29, 1960  N. ANTON  2,962,615
RUGGEDIZED ANODE CONSTRUCTION
Filed March 5, 1957
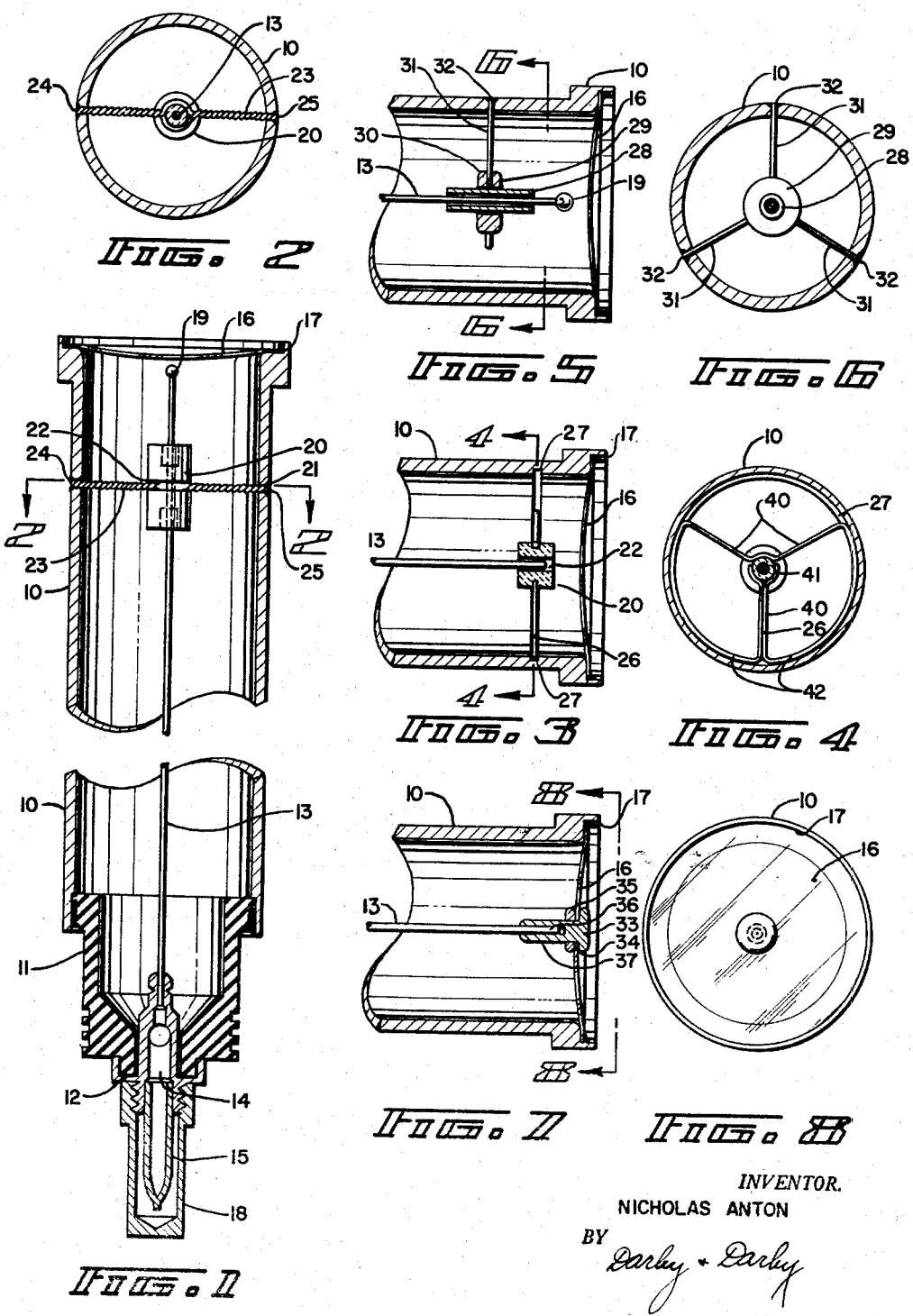
INVENTOR.
NICHOLAS ANTON
BY
Darby & Darby
ATTORNEYS.

United States Patent Office 2,962,615
Patented Nov. 29, 1960

2,962,615

RUGGEDIZED ANODE CONSTRUCTION

Nicholas Anton, 1226 Flushing Ave., Brooklyn, N.Y.

Filed Mar. 5, 1957, Ser. No. 644,169

14 Claims. (Cl. 313—93)

The present invention relates to an improvement in the construction of radiation detector tubes and is more particularly concerned with improvements in anode construction in proportional and Geiger-type counter tubes.

The general construction of such tubes has been described in Patent No. 2,776,390, issued on January 1, 1957 and entitled "Radiation Detector Tube." In that patent, a new and improved construction of radiation detector tube is disclosed. The basic components of that tube and of prior Geiger-type counter tubes consist of a cylindrical cathode electrode forming the major portion of the envelope of the device and an anode supported in cantilever fashion coaxial with the cylindrical cathode.

A difficulty encountered in all previous devices of this sort as well as in the tubes disclosed in the prior patent, arises out of the fact that the anode is generally formed by a stiff wire having a diameter at times as small as .025 inch, and cantilevered from its support at one end of the tube. The thinness of the wire and the manner of support allow the wire to vibrate and shake whenever any external force or shock is exerted on the tube. In addition, tubes of this type have a natural anode frequency causing excessive vibration of the anode even when the tube is seemingly at rest in relation to external forces. There are times when the tube is either inoperative or unreliable due to the violent vibration of the anode. Under such vibration or strong shock, the anode may bend or may vibrate so as to touch the cathode. Under less violent vibration or shock, the vibration of the anode results in changes in capacity such as to transmit an undesired impulse to the recording circuit. The number of counts or impulses thus obtained are not only due to radiation but to changes in capacity of the detecting tube, and are thus inaccurate.

At times the results of such vibration and changes in capacity have so undermined the results obtained from the use of the tube as to make the tube inoperative or give an extremely distorted result.

This problem has specific importance in military uses of such a tube. It can be understood that a tube such as this may be used in an infinite variety of specific detecting devices. It may be used in a device mounted upon a jeep or other vehicle so as to have mobility over a prescribed land area. It may be mounted for greater mobility in airplanes or ships. In each of these instances such a tube would be subjected to forces and shocks that may at times be so violent as to be destructive of the presently manufactured devices and will under normal conditions be subjected to increased vibrations sufficient to influence the capacity of the anode and create sizable errors in detection.

In addition radiation detectors and their component detector tubes are becoming increasingly important as measuring devices in many areas of industry and public health. In these areas of use these devices are required to be constructed with the utmost care that they may be sturdy and strong in order that they perform the functions required of them.

According to the present invention, simple and effective means have been discovered to eliminate such vibration and preclude errors from entering into the detected results because of the vibration of the anode.

Another advantage of this invention is to lengthen the life of such Geiger-type tubes by decreasing the amount of stress and strain forces applied to their elements.

Other objects and advantages of the present invention will become more fully apparent from consideration of the following description taken in conjunction with the appended drawings, in which Fig. 1 is a longitudinal cross-sectional view of an axially symmetric detector tube embodying a form of the present invention;

Fig. 2 is a cross-sectional view of Fig. 1 along line 2—2 thereof;

Fig. 3 is a portion of a longitudinal cross-sectional view of a similar detector tube showing a second form of this invention;

Fig. 4 is a cross-sectional view along line 4—4 of Fig. 3;

Fig. 5 is a view similar to Fig. 3 showing yet a third form of this invention;

Fig. 6 is a cross-sectional view along line 6—6 of Fig. 5;

Fig. 7 is a portion of a longitudinal cross-sectional view of another form of detector tube, showing another form of the present invention;

Fig. 8 is an end view of the detector tube of Fig. 7.

Referring specifically to the drawings, the tube in which the present invention is used comprises a cylindrical cathode 10 forming the major portion of the envelope of the detector tube. Sealed to the cathode 10 at one end thereof is an insulator 11 such as of ceramic material or the like, to which is sealed an anode support 12 formed of conductive material. An anode 13 is normally supported in cantilever fashion from the anode support 12 and is formed of a stiff wire such as .025 inch diameter stainless steel wire. The anode support 12 has a bore 14 extending axially thereof. An exhaust tubulation 15 communicates with and is sealed to the bore 14 of anode support 12. The remainder of the enclosure of the device is provided by a radiation-permeable window 16 formed of plastic, mica or the like, and sealed at 17 to the cathode envelope 10.

In usual fashion the envelope formed of window 16, cathode 10, insulator 11 and anode support 12 is evacuated through the tubulation 14 and is then filled with a suitable gas and a quenching agent. An anode terminal 18 is secured to the anode support 12 as by threading and/or soldering to form one terminal for the device, the other terminal being formed by the conductive cathode envelope 10. A glass or other insulating bead 19 is often formed at the tip of the anode wire 13 to prevent accidental contact with cathode 10 and to avoid corona discharge at the tip of the anode wire.

This description is illustrative in particular of the tube described in the prior patent cited above and except for the novel features disclosed or claimed therein, generally of any of the prior tubes or similar devices known in the art. A tube such as that above described is subject to the disadvantage of vibration indicated above.

According to the present invention the vibration is totally and effectively eliminated by the application of one of the features described hereinbelow. As seen in Figs. 1 and 2, insulating sleeve 20 of ceramic or other suitable non-conductive material having a bore 21 of substantially the same diameter as the anode 13, so that said sleeve may be fitted tightly over the anode, is fixed to the anode at an appropriate distance from the window end of said envelope, such as ⅝ inch. Looped around the insulator sleeve 20 in an annular groove 22 formed therein are a pair of twisted wires 23 stretched tightly, passed through holes 24 and 25 in metal cathode 10, and welded therein to maintain the sealed enclosure. The twisted wires may be of any suitable material. For example, Sealmet SC-1 wire of .015 diameter may be used and the weld may be made by any one of the processes known in the art.

Figs. 3 and 4 show another device for supporting a similar insulator sleeve 20 and anode 13. Mounted within the tube is a retaining clip 26 formed of resilient wire bent at points along its length to form four legs 40 each having a length approximately equal to the radius of the cathode cylinder 10 and a number of arcs forming an inner portion 41 of substantially circular shape fitting into recess 22 and an outer portion 42 of substantially concentric shape fitting into an annular groove 27 cut into the inner wall of the cathode 10, a suitable distance from the window 16. The retaining clip bearing with equal force upon the anode sleeve 20 and the wall of the cathode 11 effectively prevents the anode from vibrating.

This device is especially advantageous as the parts are easily prefabricated and require little skill or effort to assemble. It requires no welding or other fastening operation, and it may be included in a completed detector tube without any material alteration in the retail price.

Another means by which the anode may be prevented from vibrating is shown in Figs. 5 and 6. An insulator sleeve 28 also made of ceramic or other non-conductive material is surrounded by a stainless steel washer 29 permanently attached thereto by any suitable metal to glass seal. This assembly is then mounted upon anode 13. Within the periphery of the stainless steel washer 29 are a number of recesses 30 into which are welded or cemented radially extending stainless steel wires, rods or strips 31. The elements 31 are attached to the washer 29 before the sleeve 28 is positioned on the anode 13, after which the elements 31 are made taut and their ends are welded or cemented into holes 32 formed in the envelope 10 a suitable distance from the window edge of envelope 10.

In the structures disclosed, the insulator sleeve is preferably placed approximately ⅝ inch from the window edge of said tube envelope. This is not at all a necessary or a definite requirement. It is obvious that the insulating sleeve may be placed at any reasonable distance from the window along the anode and will thereby stop the anode from vibrating. Because of the individual characteristics of different types of detector tubes, it is necessary to determine for each, empirically, the suitable location of the insulating sleeve so as to obtain the maximum vibration stoppage. It has been determined that the placing of the insulated sleeve along the anode in no way effects the anode's ability to attract ions or the tube's efficiency in detecting radiation.

Another way to stop vibration of the anode is shown in Figs. 7 and 8, in which a small button 33 is inserted and sealed into a hole 34 made in the center of the radiation-permeable window 16. The button 33 can be made from stainless steel, ceramic or other suitable material and sealed to the window with a washer 35 by a powdered glass seal or any other suitable glass-to-metal or other seal. The anode 13 is elongated to fit into a bore 36 within an extension 37 of the button 33. The coefficients of expansion of the button and window should be substantially the same so that the vacuum seal between the two will hold well. A small amount of clearance is allowed between the tip of the anode 13 and the bottom of hole 35 in the button 33 to allow for difference in expansion there and for stretching of the window 16. It is also possible to make the button of a ceramic material such as American Lava "Fosterite 243 Body."

Any one of the embodiments of this invention shown in Figs. 1 to 6 may be combined with this last form so as to have a support structure at the tip of the anode as well as somewhere along its length.

It is apparent that the number of twisted wires or struts is relatively immaterial so long as a structure is used which effectively holds the insulator sleeve and anode taut and prevents vibration. It is apparent that the results of this invention can be obtained regardless of the specific structure used and the invention is not limited to those specific structures shown, but is defined by the claims appended hereto.

What is claimed is:

1. In a radiation detector tube of the type for detecting alpha, beta and gamma radiation comprising a gastight envelope comprising a hollow axially symmetrical conductive cathode, a radiation-permeable window sealed across one end of said cathode, an insulator sealed at the other end of said cathode, and an anode wire mounted in cantilever fashion and sealed to said insulator and extending coaxially within said cathode and terminating adjacent said window; the improvement comprising an anode support structure comprising an insulating sleeve positioned along said anode wire adjacent the unsupported end of said anode and extending beyond the free tip of said anode, and a support member engaging said insulating sleeve and said cathode to hold said insulating sleeve in fixed position to prevent said anode wire from vibrating.

2. In a radiation detector tube comprising a gas-tight envelope comprising a hollow axially symmetrical conductive cathode, a radiation-permeable window sealed across one end of said cathode, said radiation including alpha and beta rays, an insulator sealed at the other end of said cathode and an anode wire mounted in cantilever fashion and sealed to said insulator and extending coaxially within said cathode terminating adjacent said radiation permeable window, the improvement comprising an anode support structure comprising an insulating sleeve positioned along said anode wire, and a support member engaging said insulating sleeve and said cathode to hold said insulating sleeve in fixed position to prevent said anode from vibrating, said support member comprising a resilient retaining clip formed of a wire bent along its length and at its ends to form a substantially circular inner portion and a substantially concentric outer portion, said retaining clip having said inner portion circularly engaging said insulating sleeve and said outer portion engaging said cathode.

3. In a radiation detector tube comprising a gas-tight envelope comprising a hollow axially symmetrical conductive cathode, a radiation-permeable window sealed across one end of said cathode, said radiation including alpha and beta rays, an insulator sealed at the other end of said cathode and an anode wire mounted in cantilever fashion and sealed to said insulator and extending coaxially within said cathode terminating adjacent said radiation permeable window, the improvement comprising an anode support structure comprising an insulating sleeve positioned along said anode wire, and a support member engaging said insulating sleeve and said cathode to hold said insulating sleeve in fixed position to prevent said anode from vibrating, said support member comprising a plurality of metal wires looped around said sleeve, said wire being twisted tautly and attached at the outer ends thereof to said cathode.

4. In a radiation detector tube comprising a gas-tight envelope comprising a hollow axially symmetrical conductive cathode, a radiation-permeable window sealed across one end of said cathode, said radiation including alpha and beta rays, an insulator sealed at the other end of said cathode and an anode wire mounted in cantilever fashion and sealed to said insulator and extending coaxially within said cathode terminating adjacent said radiation permeable window, the improvement comprising an anode support structure comprising an insulating sleeve positioned along said anode wire, and a support member engaging said insulating sleeve and said cathode to hold said insulating sleeve in fixed position to prevent said anode from vibrating, said support member comprising a plurality of tensioned metal struts attached to and radiating from said insulating sleeve and attached to said cathode.

5. In a radiation detector tube of the type for detecting alpha, beta and gamma radiation comprising a gas-tight envelope comprising a hollow axially symmetric cathode, a radiation-permeable window sealed across one end of said cathode, said radiation being of the type comprising alpha, beta and gamma rays, an insulator sealed at the other end of said cathode, and an anode wire mounted in and sealed at one end to said insulator, extending coaxially within said cathode and terminating at the other end adjacent said window; the improvement comprising an anode support structure comprising a button member attached to the center of said radiation-permeable window and sealed therewith, said button member slidably engaging said other end of said anode wire so as to support said end against vibration.

6. An anode support structure as claimed in claim 5, in which said anode support button attached to said radiation-permeable window is made of stainless steel.

7. An anode support structure as claimed in claim 5, in which said anode support button is made of a ceramic material.

8. In a radiation detector tube of the type for detecting alpha, beta and gamma radiation comprising a gas-tight envelope formed at least in part of a hollow axially symmetrical cathode, a radiation-permeable window sealed across one end of said cathode, an insulator sealed at the other end of said cathode, and an anode wire mounted in and sealed to said insulator and extending coaxially within said cathode; the improvement comprising an anode support structure comprising a substantially cylindrical ceramic sleeve positioned along said anode wire said sleeve having an annular groove formed therein, a sleeve support member comprising a pair of metal wires each having a position within said groove and on opposite sides of said sleeve, said metal wires being twisted tautly and attached at the outer ends thereof to said cathode to hold said ceramic sleeve in fixed position to prevent said anode from vibrating.

9. In a radiation detector tube of the type for detecting alpha, beta and gamma radiation comprising a gas-tight envelope comprising a hollow axially symmetrical cathode, a radiation-permeable window sealed across one end of said cathode, an insulator sealed at the other end of said cathode, and an anode wire mounted in and sealed to said insulator and extending coaxially within said cathode; the improvement comprising an anode support structure positioned along said anode wire, comprising a cylindrical ceramic sleeve having an annular metal washer fastened thereto, said annular washer having a plurality of recesses formed along the periphery thereof, and sleeve support means comprising a plurality of tensioned metal struts each fastened at one end to said washer at a respective one of said recesses and extending radially therefrom, each strut being fastened at the other end thereof to said cathode, whereby said ceramic sleeve is held in fixed position preventing said anode from vibrating.

10. In a radiation detector tube of the type for detecting alpha, beta and gamma radiation comprising a gas-tight envelope formed of a hollow axially symmetrical conductive cathode, a radiation-permeable window sealed across one end of said cathode, an insulator sealed at the other end of said cathode, an anode wire mounted in and sealed to said insulator and extending coaxially within said cathode, and wherein an annular groove is formed within the internal wall of said cathode; the improvement comprising an anode support structure positioned along said anode wire, comprising a substantially cylindrical ceramic sleeve having an annular groove therein, a sleeve support member comprising a resilient retaining clip formed of a metal wire bent along its length and at its ends to form a substantially circular inner portion and a substantially concentric outer portion, said retaining clip having said inner portion circularly engaging said ceramic sleeve within said groove and said outer portion positioned within said annular cathode groove whereby said insulating sleeve is held in fixed position, preventing the said anode from vibrating.

11. In a radiation detector tube comprising a gas-tight envelope comprising a hollow axially symmetrical cathode, a radiation-permeable window sealed across one end of said cathode, said radiation being of the type comprising alpha, beta, gamma rays; an insulator sealed at the other end of said cathode, and an anode wire mounted in and sealed at one end to said insulator, extending coaxially within said cathode and terminating at the other end adjacent said window; the improvement comprising an anode support structure comprising a substantially T-shaped button having a bore formed within the leg thereof, said button being sealed within the center of said radiation-permeable window and slidably engaging said other end of said anode wire within said bore so as to support said end against vibration.

12. A radiation detector tube comprising a hollow axially symmetrical conductive cathode, a radiation permeable window hermetically sealed across one end of said cathode, said radiation permeable window lying in a plane substantially transverse to the axis of said cathode and having low absorption characteristics for beta radiation, an insulator hermetically sealed at the other end of said cathode, an anode wire mounted in cantilever fashion and sealed to said insulator and extending coaxially within said cathode terminating adjacent said window, a button member attached to the center of said radiation permeable window and sealed therewith, said button member slidably engaging the other end of said anode wire so as to support said end against vibration.

13. A radiation detector tube comprising walls forming a hermetically sealed chamber having spaced apart end portions, one end portion of said chamber being provided with a radiation permeable window, an anode wire disposed axially within said chamber having one end disposed within the other end portion of the chamber, and the other end of said anode wire terminating adjacent said radiation permeable window, an insulating sleeve positioned along said anode wire and a support member engaging said insulating sleeve and said walls of said chamber to hold said insulating sleeve in fixed position to prevent said anode wire from vibrating, said anode wire and said support member all being electrically insulated from said chamber.

14. An anode supporting structure as claimed in claim 1 wherein said insulating sleeve being provided with sufficient clearance between said sleeve and said anode to permit axial movement of the anode relative to the sleeve.

References Cited in the file of this patent

UNITED STATES PATENTS

| | | |
|---|---|---|
| 2,523,287 | Friedman | Sept. 26, 1950 |
| 2,552,723 | Koury | May 15, 1951 |
| 2,727,154 | Goldsworthy | Dec. 13, 1955 |
| 2,835,839 | Borzin | May 20, 1958 |
| 2,837,678 | Hendee et al. | June 3, 1958 |